CROSSED FIELDS ELECTRON BEAM PARAMETRIC AMPLIFIER

Filed May 13, 1960 3 Sheets-Sheet 1

INVENTOR
J. W. KLÜVER
BY David P. Kelley
ATTORNEY

Jan. 4, 1966 J. W. KLÜVER 3,227,959

CROSSED FIELDS ELECTRON BEAM PARAMETRIC AMPLIFIER

Filed May 13, 1960 3 Sheets-Sheet 2

INVENTOR
J.W. KLÜVER
BY David P. Kelley
ATTORNEY

INVENTOR
J. W. KLÜVER
BY David P. Kelley
ATTORNEY

United States Patent Office 3,227,959

Patented Jan. 4, 1966

3,227,959

CROSSED FIELDS ELECTRON BEAM PARAMETRIC AMPLIFIER

Johan Wilhelm Klüver, Murray Hill, N.J., assignor to Bell Telephone Laboratories, Incorporated, New York, N.Y., a corporation of New York Filed May 13, 1960, Ser. No. 28,918
15 Claims. (Cl. 330—4.7)

This application is a continuation-in-part of my copending United States patent application Serial No. 822,128, filed June 22, 1959, now abandoned.

The present invention relates to electron discharge devices and, more particularly, to such devices of the parametric amplifier type.

The term "parametric amplifier" in general refers to a family of electrical devices in which amplification is achieved through the periodic variation of a circuit parameter. It has been found that this principle can be applied to electron discharge devices to achieve heretofore unattainable results. In the conventional traveling wave tube, for example, amplification can take place only through signal wave interaction with slow space charge waves, i.e., space charge waves which propagate at a phase velocity which is slower than the D.C. velocity of the beam. It is well known that energy which propagates as a slow space charge wave is at a lower kinetic energy level than the energy level of the D.-C. unmodulated beam. Spurious noise energy which propagates as slow space charge waves cannot therefore be extracted by well-known devices such as the Kompfner-Dip helix or the cavity resonator, and one must resort to the use of elaborate electron guns, cooling systems, etc., for reducing noise.

Through the principles of parametric amplification, however, a beam device may be operated in the fast space charge mode. Energy propagating as a fast space charge wave is at a higher kinetic energy level than that of the unmodulated beam and can be conveniently extracted. Hence, in a beam device of the parametric amplifier type, a signal wave is caused to propagate along the beam as a fast space charge wave, fast space charge wave noise energy is extracted from the beam, and the fast space charge signal wave is subsequently parametrically amplified and thereafter removed with a relatively low noise content. The beam of the parametric amplifier described can be considered as being a transmission medium for allowing amplification of a signal wave which propagates thereon. Power for signal amplification is derived from "pump" frequency energy which is used to provide the necessary parametric variations.

Signal waves are caused to propagate as space charge waves through charge density modulation of the beam. Often it is desirable to cause the signal energy to propagate as a fast cyclotron wave. Cyclotron wave propagation results from the application of forces to the beam which are transverse to the beam's magnetic focusing field. These transverse forces are exerted by electric fields of the signal wave and impart a rotational velocity component to individual electrons of the beam. The radius and velocity of rotation of individual electrons are a result of increments of the signal wave. The cyclotron wave can therefore be considered as resulting from modulation of the radii of rotation of individaul electrons.

Operation through fast cyclotron wave interaction offers the same basic advantages of fast space charge wave operation in that spurious fast cyclotron noise waves may be "stripped" from the beam. It is advantageous over space charge operation in that a fast cyclotron wave is highly dispersive, i.e., the phase velocity of a fast cyclotron wave can be made to vary rapidly with frequency. As a result, spurious noise energy which exists at frequencies beyond the bandwidth of frequencies which have been stripped from the beam are greatly separated, in terms of phase velocity, from the signal and pump waves on the beam. This large velocity separation is advantageous in that it prohibits certain of these noise frequencies from "spilling down" or coupling with the signal and pump waves to degrade overall tube performance.

Parametric amplifiers which utilize the phenomenon of cyclotron wave propagation are often referred to as cyclotron resonant devices but will hereinafter be called transverse field devices. The beam of such a device is longitudinally focused; in other words, the magnetic focusing field is parallel with the direction of beam flow. Signal energy is coupled to the beam by any of various forms of lumped resonant circuit input couplers. As the beam travels through the coupler, the signal energy imparts forces on individual electrons which are transverse both to the magnetic field and the direction of beam flow. Electrons in succeeding transverse planes of the beam are given "kicks" of varying strength according to the varying strength of the signal wave and thereafter travel helical paths to the collector terminal. As will be explained hereinafter, the rotational frequency of the electrons is directly proportional to the magnetic flux density of the focusing field. Substantial synchronism between the signal wave and the fast cyclotron mode of the beam is achieved by adjusting the magnetic field so that the rotational frequency or "cyclotron frequency" of the electrons is approximately equal to the signal frequency. Signal energy thereafter propagates along the beam as a fast cyclotron wave.

Pump energy is transferred to the beam by a coupler such as a quadrupole arrangement which produces a nonunifom electric field through a transverse portion of the beam. This coupler is excited with a pump frequency which is usually twice the cyclotron frequency to insure proper synchronism with the fast cyclotron signal wave. At any given instant, succeeding poles are of opposite polarity, and electrons which are within the quadrupole coupler are forced to follow either larger or smaller radii of rotation depending upon their phase position. An increased radius of rotation represents signal gain, while a decrease represents signal loss. There is always a net increase of radius of rotation, however, and therefore a net gain or amplification of the signal cyclotron wave. Prior to signal amplification, spurious fast cyclotron wave noise energy excites electric fields in the input coupler and is thereby extracted from the beam. Subsequent to signal amplification, the fast cyclotron wave signal energy is extracted from the beam by the same operation and is transmitted to an appropriate load for utilization.

Although the aforementioned transverse field type of parametric amplifier offers many obvious advantages, certain deleterious second order effects present themselves. Since the magnetic focusing field is directed along the length of the beam, and since this field must be very strong to insure beam synchronism between the signal wave and the fast cyclotron wave at high frequencies, the focusing arrangement often becomes very large and cumbersome and also requires a large quantity of power.

Further, transverse charge density inhomogeneities excite electric fields in the input and pump couplers. By cross coupling, a small portion of this spurious energy may couple to the fast cyclotron signal wave and be manifested at the output as noise. Further sources of noise are the load impedances associated with the input coupler. These load impedances reflect spurious frequencies to the input coupler which are then transferred to the beam. As will be fully explained hereinafter, load noise which is particularly harmful is that which exists at the "idler" frequency or at a frequency equal to the difference of the pump and signal frequencies.

In addition to the high longitudinal magnetic field which is necessary, other disadvantages accrue when an attempt is made to amplify extremely high frequencies. First, it is always necessary that the pump frequency be higher than the signal frequency and for optimum low noise operation it is necessary that it be twice the signal frequency. At extremely high frequencies, however, the electric fields produced by an array of poles tend to become concentrated between adjacent poles rather than extending throughout the beam. Each of these effects results in lower gain. Secondly, the high magnetic field which is necessary at such high frequencies focuses the beam very strongly and forces individual electrons to follow smaller orbits, thereby further limiting the interaction between the pump fields and the fast cyclotron wave. Thirdly, the extremely small resonant circuit couplers which must be used at such high frequencies are mechanically very difficult to build.

Certain other mechanical inconveniences also present themselves, particularly with respect to the gun structure. As will be explained hereinafter, it is desirable that the electron beam travel at relatively slow D.-C. drift velocity. In a longitudinally focused device, however, low noise requirements dictate that the electrons leave the cathode at a high velocity. For optimum operation then, a series of accelerating and decelerating electrodes must be used between the cathode and input coupler. Further, the pump coupler must necessarily be physically very close to the beam and the slightest misalignment of the gun structures may cause electron impingement thereon.

I have found that, through the use of certain new concepts, the advantages of the conventional transverse field type parametric amplifier can be achieved while obviating the aforementioned deleterious second order effects. Certain other advantages are also attainable as will become apparent hereinafter.

Accordingly, it is a general object of this invention to provide low noise amplification of electromagnetic waves.

It is another object of this invention to reduce the power requirements of a parametric amplifier of the transverse field type.

It is a further object of this invention to provide parametric amplification through the use of a transverse field device of simple structure.

It is still another object of this invention to provide parametric amplification of extremely high frequency electromagnetic waves through the use of a transverse field device.

These and other objects of this invention are achieved in an illustrative embodiment thereof in which an electron beam is formed and projected along a path. Extending along a portion of this path is signal input apparatus for imparting rotational energy to the electrons of the beam in accordance with the amplitude of an input signal wave, whereby the signal wave is caused to propagate along the beam as a fast cyclotron wave as will be more fully explained hereinafter. Noise extracting apparatus is also included for removing certain fast cyclotron wave noise energy from the beam. Amplification of the signal wave is effected through apparatus which couples pump frequency energy to the beam in synchronism with the fast cyclotron signal wave propagating on the beam. Subsequent to the foregoing operations, the amplified signal wave is extracted by output apparatus which operates in a manner similar to the noise extracting apparatus.

In accordance with aspects of my invention, the electron beam of the device embodying my invention is focused by crossed electric and magnetic fields. When such focusing is used, rotational energy can be imparted to the beam in the longitudinal plane of beam flow.

Whereas rotational energy which is imparted to electrons in a transverse plane of the beam results in a helical motion of these electrons, rotational energy which is imparted in the longitudinal plane results in a cycloid-like motion of the electrons. As will become apparent hereinafter, the field of a propagating electromagnetic wave may therefore be used for imparting rotational energy to the beam. Further, because the magnetic field extends only over a relatively short distance, the magnets themselves may be quite small and require a relatively small power input for producing a high flux density. Another advantage is derived from the fact that the cathode of a crossed field device may emit relatively slow velocity electrons with substantially no increase in noise content. Further, the beam may be made as wide as is desirable, although it must necessarily be very thin. As will be explained hereinafter, a large beam current in a thin beam is often very advantageous.

It is another feature of this invention that distributed circuits be used for coupling signal and pump energy to the beam and for extracting fast cyclotron noise waves and fast cyclotron signal waves from the beam. As pointed out above, I have found that a propagating electromagnetic wave field in synchronism with the fast cyclotron wave of a crossed field device will couple thereto. Therefore, any of several types of well-known distributed circuits, such as an interdigital structure, Millman structure, or various wave guides may be utilized for coupling signal or pump power to the beam.

One advantage of the use of distributed circuits is the fact that the effect of spurious electric fields which are induced in the input and pump couplers by transverse charge density inhomogeneities in the beam is lessened to such an extent as to be negligible. Because the coupling coefficient of a lumped circuit is very high, a large quantity of spurious energy may be instantaneously cross-coupled into the fast cyclotron wave and appear at the output together with the signal as noise energy. On the other hand, the coupling coefficient of a distributed circuit is quite small and only negligible portions of energy due to charge density inhomogeneities can couple back to the fast cyclotron wave.

Another advantage of using distributed circuits is the fact that the cyclotron frequency need not be approximately equal to the signal frequency. Proper synchronism between the signal and the fast cyclotron wave of the beam can be attained merely by using a distributed circuit having a suitable predetermined propagation constant. If extremely high frequency pump power is used in the distributed circuit, a distributed circuit of the wave guide type is advantageous in that the electric fields produced thereby extend uniformly throughout the beam. Hence, gain does not decrease with increasing frequency.

An advantage of a distributed circuit in the input section is that it can be used not only for coupling the signal wave to the beam but also for stripping two widely separated frequency bands from the fast cyclotron wave of the beam. In addition to stripping beam noise in the signal band, it is also necessary to strip noise from the beam in the band of frequencies in which the idler frequency may exist because the idler couples strongly to the signal frequency and spurious energy existing thereat is manifested at the output. If the pump frequency is twice the signal frequency, the idler frequency (pump frequency minus signal frequency) will equal the signal frequency and they can both be extracted by the signal input coupler through well-known principles. As will be explained hereinafter, it is often advantageous to make the idler frequency much higher than the signal frequency to reduce the effect of load noise which may be introduced onto the beam at the input coupler. Even when such a large frequency difference exists, one distributed circuit can be used to remove noise at both signal and idler frequency bands, rather than using separate couplers for each.

It is a feature of one embodiment of this invention that the aforementioned distributed circuits be wave guides, or fast wave structures, through which the electron beam travels. One obvious advantage in using wave guides for coupling energy to, and extracting energy from, an electron beam is the inherent simplicity of the structures involved. Further, since the beam travels within the wave guide, the electric fields of propagating electromagnetic wave extend uniformly throughout the beam regardless of frequency, and there is no reduction of gain with increasing frequency. At lower frequencies, however, this device may be undesirably long.

Accordingly, it is a feature of another embodiment of this invention that the aforementioned distributed circuits be slow wave structures. This embodiment is particularly useful for low frequency operation in that the tube may be made physically quite short.

It is a feature of another embodiment of this invention that the input, pump and output couplers be combined into one unit. As will be explained hereinafter, it is possible to use a single distributed circuit for doing the following: Causing signal energy to propagate along the beam as a fast cyclotron wave; extracting fast cyclotron wave noise from the beam; propagating a pump wave in coupling relationship to the beam; extracting the fast cyclotron signal wave from the beam. This feature, of course, results in a very simple tube structure. Indeed, when the distributed circuit used is a wave guide, the number of structural elements involved would appear to be an irreducible minimum.

These and other features of my invention will become clearly understood from the following detailed description, taken in conjunction with the attached drawing, in which.

Figure 1:
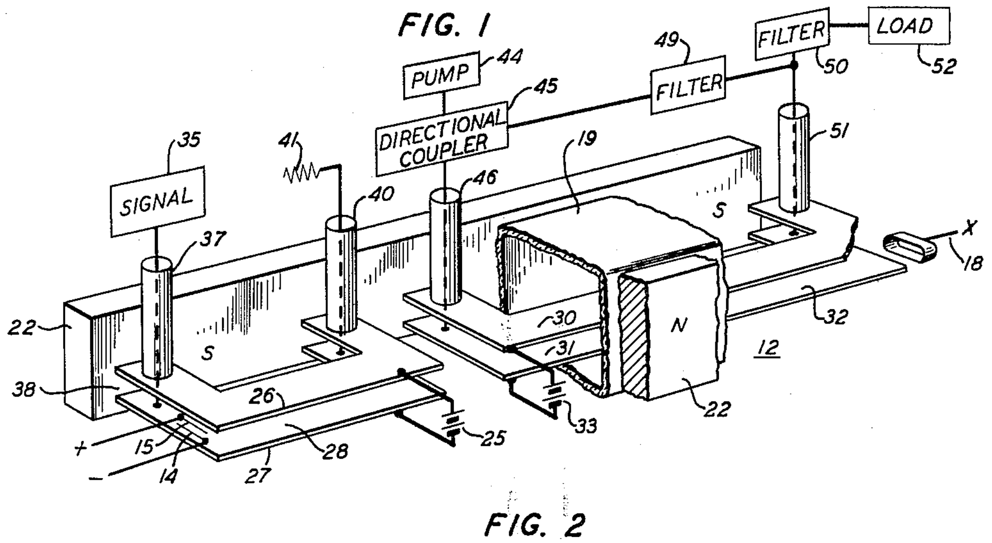
FIG. 1 is an isometric view of one illustrative embodiment of my invention.

Referring now to FIG. 1, there is shown an electron discharge device 12 which utilizes the principles of one embodiment of my invention. At one end of device 12 is a wire cathode 14 and a wire accelerating anode 15. The wire cathode 14 is heated by current flow through the wire and is placed in the D.-C. field of the plates of the wave guide 28, discussed further below, with the wire acceleration anode adjacent thereto. By this arrangement, a very thin, wide electron beam is emitted from the wire cathode and is properly projected, due to the effects of the D.-C. field between the plates of the wave guide and the accelerating anode, along the device. At the opposite end of device 12 is a collector 18 which intercepts the beam of electrons from the cathode 14. Enclosing cathode 14, anode 15 and collector 18 is an evacuated envelope 19, only a portion of which is shown for purposes of clarity.

Figure 2:
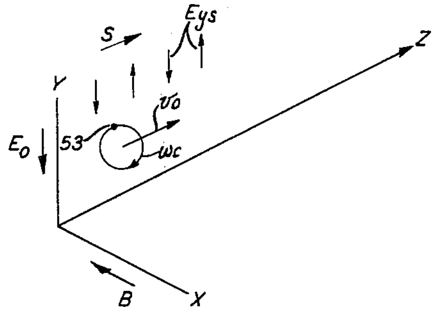
FIG. 2 is a graph illustrating various force which coact within the device of FIG. 1.

The electron beam is focused by a magnetron or crossed field focusing arrangement. Extending along substantially the entire length of device 12 are a pair of oppositely polarized magnets 22. Although only a portion of one of the magnets is shown, it is to be understood that they are of substantially equal length. Magnets 22 may be energized to create a substantially uniform magnetic field therebetween by any of a number of well-known methods. A voltage source 25 maintains a D.-C. potential difference between plates 26 and 27 of wave guide 28 thereby creating an electric field therebetween. The same D.-C. voltage is applied to plates 30 and 31 of wave guide 32 by a voltage source 33. FIG. 2 is included to show the relative directions of the D.-C. electric field $E_0$, the magnetic field B, and the beam drift velocity $v_0$.

An electromagnetic signal wave from a signal source 35 is transmitted via coaxial cable 37 to a lateral extension 38 of wave guide 28. As will be described hereinafter, wave guide 28 causes the signal wave to propagate along the electron beam as a fast cyclotron wave. Certain noise energy is extracted from the beam as will also be described hereinafter and is transmitted via coaxial cable 40 to an impedance 41 where it is dissipated.

An electromagnetic pump wave is transmitted to wave guide 32 from a pump source 44 via a directional coupler 45 and a coaxial cable 46. A filter 49 having a stop band at the signal frequency and a filter 50 having a stop band at the pump frequency are both connected to a coaxial cable 51 connected to the other end of wave guide 32. After propagating along wave guide 32, the pump wave will therefore be transmitted through filter 49. Directional coupler 45 will cause the pump wave to be transmitted through coaxial cable 46 back to wave guide 32. Directional coupler 45 also prevents pump energy from source 44 from propagating directly to filter 49. Wave guide 32 extracts fast cyclotron wave signal energy from the electron beam whereafter it is transmitted via filter 50 to an appropriate load 52. Filter 49 prevents signal energy from being transmitted to directional coupler 45.

Parallel plate wave guides such as 28 and 32 are commonly known as "strip" lines and support a TEM mode of electromagnetic wave propagation. As shown in FIG. 2, the electric fields of a TEM wave such as the signal wave S propagating along wave guide 28 will create an alternating electric field in the $y$ direction $E_{ys}$ which is exclusively transverse to both the magnetic field and the direction of beam flow.

In the absence of other forces, any electron which is in a magnetic field will rotate if a force transverse to the magnetic field is applied thereto. The angular velocity of such rotation, or the cyclotron frequency, is given by:

$$\omega_c = Be/m \quad (1)$$

where B is the flux density of the magnetic field and $e/m$ is the charge-to-mass ratio of the electron. The tangential velocity $v_t$ of such a rotating electron is a function of the transverse force applied thereto as is the radius of rotation which is given by:

$$r = \frac{mv_t}{Be} \quad (2)$$

Hence, electric field energy can be converted to electron rotational kinetic energy, the velocity and radius of rotation being indicative of electrical energy so converted. By the same token, an electron moving transverse to the magnetic field may give up kinetic energy to the electric field.

If an alternating field is synchronized with the cyclotron frequency $\omega_c$, of an electron beam, energy conversion either from the field to the beam or from the beam to the field will result in a pattern of successive electrons which corresponds to the alternating field frequency. This electron pattern, or cyclotron wave, will propagate at a phase velocity which is larger or smaller than the D.-C. velocity of the beam depending upon whether energy is added to, or extracted from, the unmodulated beam. The general equation for the phase constant $\beta$ of a cyclotron wave created by an alternating electric field of frequency $\omega_s$ is:

$$(\omega_s - \beta v_0)^2 = \omega_c^2 - \omega_q^2) \quad (3)$$

where $v_0$ is the average electron velocity or drift velocity and $\omega_q$ is the plasma frequency of the space charge waves.

If $\omega_c^2 >> \omega_q^2$ that is, if the effect of the space charge forces are negligible compared to the forces exerted on the electrons by the magnetic field, the two solutions to Equation 3 are:

$$\beta_{slow}=\frac{\omega_s+\omega_c}{v_0}$$

$$\beta_{fast}=\frac{\omega_s-\omega_c}{v_0} \quad (4)$$

The phase velocity $v_p$ of any propagating wave is given by:

$$v_p=\omega/\beta \quad (5)$$

Therefore, phase constant $\beta_{slow}$ represents cyclotron wave propagation at a phase velocity lower than that of the beam drift velocity $v_0$, while $\beta_{fast}$ represents a faster phase velocity than $v_0$. For obvious reasons, these two possible waves are respectively called the slow and fast cyclotron wave.

The electric and magnetic focusing fields of device 12 are adjusted so that the electron beam will travel with a constant velocity $v_0$. Referring to FIG. 2, consider an observer moving with velocity $v_0$ and "looking" in the direction of the flux density B. Transverse forces on an electron due to $E_{ys}$ will cause an electron to rotate according to Equation 1. The angular velocity is $\omega_c$ and, by the left-hand rule, the rotation will be in the clockwise direction as shown. The angular velocity $\omega_c$ and the longitudinal velocity $v_0$ give the individual electron a trochoidal trajectory. The actual trajectory has not been shown since it depends on the relative values of these two velocities which may be varied as desired.

Figure 3:
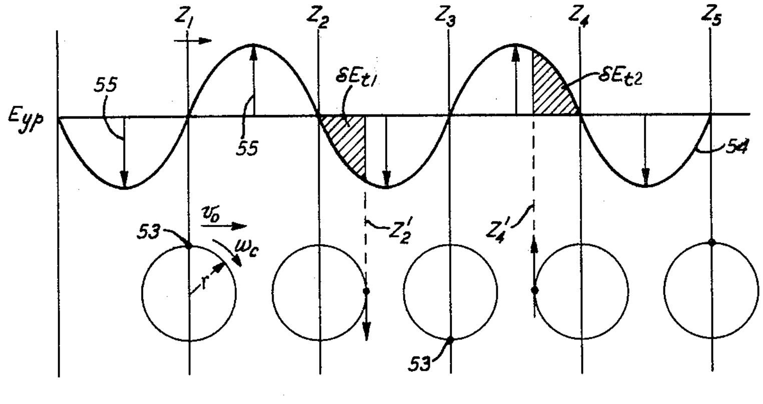
FIG. 3 is a graph illustrating electromagnetic pump wave interaction with the fast cyclotron signal wave propagating along the electron beam of the devices of FIGS. 1, 4 and 5.

FIG. 3 illustrates the successive positions $z_1$ through $z_5$ along the $z$ axis during equal time intervals of an electron 53 rotating clockwise with a radius of rotation $r$, a drift velocity $v_0$, and an angular velocity $\omega_c$.

From Equations 4, 5 and 1, it can be seen that the phase velocity of any fast cyclotron wave on the beam can be adjusted to any value above the drift velocity $v_0$ by adjusting the magnetic field B. Referring to FIG. 2, if the signal wave S which creates a radio frequency field $E_{ys}$ propagates in the same direction as $v_0$ in synchronism with the fast cyclotron wave of the beam, one would expect that eventually all of the signal energy would be converted to fast cyclotron wave energy. This phenomenon is well known in connection with space charge devices and is called the Kompfner-Dip principle.

In a space charge device the length L of a distributed circuit needed to transfer completely electromagnetic wave energy to fast space charge wave energy is:

$$(\beta L)^2=\frac{\pi^2}{2}\frac{\omega_q}{\omega}\frac{V_0}{I_0K} \quad (6)$$

Where $\beta$ and $\omega$ are respectively the phase constant and angular velocity of the electromagnetic wave, $\omega_q$ is the plasma frequency, $V_0$ and $I_0$ are the voltage and current of the unmodulated beam, and K is the interaction impedance. Conversion of electromagnetic wave energy to cyclotron wave energy in device 12 is analogous to the aforementioned space charge situation. Assuming that $\omega_c^2>>\omega_q^2$, the length L or Kompfner-Dip length for transference of signal energy, of phase constant $\beta_s$ and frequency $\omega_s$, to fast cyclotron wave energy is:

$$(\beta_s L)^2=\frac{\pi^2}{2}\frac{\omega_c}{\omega_s}\frac{V_0}{I_0K} \quad (6a)$$

and by Equation 5:

$$L^2=\frac{\pi^2}{2}\frac{\omega_c}{\omega_s}\frac{V_0}{I_0K}\left(\frac{v_f}{\omega_s}\right)^2 \quad (7)$$

The length of wave guide 28 is therefore chosen such that signal energy within a certain frequency bandwith of $\omega_s$ is substantially completely transferred to the beam. Of course, the same Kompfner-Dip length can also be used to demodulate, or extract, fast cyclotron wave noise from the beam. Hence, fast cyclotron wave noise modulations are extracted from the beam over the same length of the distributed wave guide circuit 28 and dissipated by impedance 41 as previously described.

As will be described hereinafter, a pump wave of frequency $\omega_p$ propagates along wave guide 32 in coupling relationship with the fast cyclotron signal wave. The pump and signal waves mix to produce an idler wave having a frequency:

$$\omega_i=\omega_p-\omega_s \quad (8)$$

where subscripts $i$, $p$, and $s$, respectively refer to the idler, pump and signal waves.

Beam noise energy which exists at the idler frequency must be extracted or stripped from the beam because the idler wave will couple strongly to the signal wave. If the pump frequency is twice the signal frequency, this condition is inherently met when noise energy in the signal frequency band is stripped. It is often advantageous, however, that the idler frequency be high with respect to the signal frequency because of the following. The impedances associated with the input coupler, wave guide 28, will reflect certain noise frequencies which will be coupled to the fast cyclotron wave of the beam. This noise power or load noise $P_n$ can be shown to follow the law:

$$P_n=\frac{\omega_s}{\omega_i}kT \quad (9)$$

where T is the temperature of the impedance associated with the input coupler and $k$ is Boltzmann's constant. One can therefore reduce input load noise by cooling the input section. This, of course, may require expensive and cumbersome apparatus. A more sophisticated method is to make the idler freqeuncy very high. By proper choice of the variables of Equations 7, 8 and 9 it is possible to make $\omega_i$ much higher than $\omega_s$ and still employ wave guide 28 for removing fast cyclotron wave noise energy from the frequency bands of both the signal and the idler frequencies.

Consider next the parametric interaction which takes place in wave guide 32. In the article "A Traveling Wave Ferromagnetic Amplifier," Proceedings of the Institute of Radio Engineers, volume 46, No. 4, pages 700–706, by P. K. Tien and H. Suhl, it is shown that the conditions for parametric amplification through the use of a distributed circuit are given by:

$$\omega_p=\omega_s+\omega_i \quad (10)$$

and $$\beta_p=\beta_s+\beta_i \quad (11)$$

where subscripts $p$, $s$, and $i$ refer respectively to the pump, signal and idler waves. Equation 10, of course, is virtually the same as Equation 8. It is, of course, necessary that both the signal and idler waves propagate as a fast cyclotron wave in which case, from Equations 5 and 11 the phase constant of the pump wave is:

$$\beta_p=\frac{\omega_s-\omega_c}{v_o}+\frac{\omega_i-\omega_c}{v_o} \quad (12a)$$

$$=\frac{(\omega_s+\omega_i)-2\omega_c}{v_o} \quad (12b)$$

and from Equation 10:

$$\beta_p=\frac{\omega_p-2\omega_c}{v_o} \quad (12c)$$

The pump wave, in wave guide 32, travels with the speed of light and so the parameters of Equation 12$c$ are chosen such that:

$$\beta_p=\frac{\omega_p-2\omega_c}{v_o}=\frac{\omega_c}{c} \quad (13)$$

where $c$ is the velocity of light. Assume, for purposes of illustration, that the pump frequency and the pump phase constant are respectively approximately twice the frequency and phase constant of the fast cyclotron signal wave propagating along the beam. Curve 54 of FIG. 3 represents the alternating electric field $E_{yp}$ which is "seen" by an electron 53 as it travels from position $z_1$ to $z_5$. Vectors 55 indicate the direction of force of the field of an electron.

A cursory examination of FIG. 3 indicates that between $z_1$ and $z_2$ force 55, acting upwardly, decrease the radius of rotation, while between $z_2$ and $z_3$ this force is in the same downward direction as the electron rotation and therefore would tend to increase it. Likewise, between $z_3$ and $z_4$ force 55 has an additive effect on the radius of rotation, while between $z_4$ and $z_5$ it has a substractive effect. Actually, during the interval of time in which the center of rotation of electron 53 has moved from $z_1$ to $z_2$, electron 53 has moved from $z_1$ to $z_2'$. In addition to the upward forces between $z_1$ and $z_2$, electron 53 has been acted upon by field forces illustrated by the shaded area $\delta Et_1$ which tends to increase the rotation of the beam. Also during the interval of time during which the center of rotation moves from $z_4$ to $z_5$, the electron moves from $z_4'$ to $z_5$ and is acted upon by pump field forces shown by $\delta Et_2$ in addition to the field forces between $z_4$ and $z_5$. Of course, if the electron did not rotate in the $y$–$z$ plane, the upward and downward forces of the pump field would have no net effect. Because of this rotation and the proper phase relationship with the pump field, there is a net increase of rotational energy as indicated by $\delta Et_1$ and $\delta Et_2$. One can also understand this phenomenon by observing that electron 53 is in region $z_2$–$z_4$ for a longer time period where it gains energy than in regions $z_1$–$z_2$ and $z_4$–$z_5$ where it loses energy.

It is to be reiterated that the pump frequency of device 12 need not necessarily be twice the signal frequency as described in the foregoing illustration. Indeed, it is often desirable that it be much higher in order to produce a higher idler frequency. In other cases, it may be desirable to use a lower pump frequency. Further, wave guides 28 and 32 need not necessarily be strip lines but may also be any type which supports a TM or TE mode or combinations thereof.

Wave guide 32 is constructed to be of the appropriate Kompfner-Dip length so that at the output end the signal wave will be completely transferred from the beam to the wave guide and then transmitted to load 52. Of course, a separate pump wave guide can be used for propagating pump energy together with a separate output section for extracting the signal energy from the beam. In such a case the pump wave guide must have a stop band at the signal frequency band to prevent transference of signal energy thereto. This embodiment is desirable if only low pump powers are available since a more effective pump action will occur.

Figure 4:
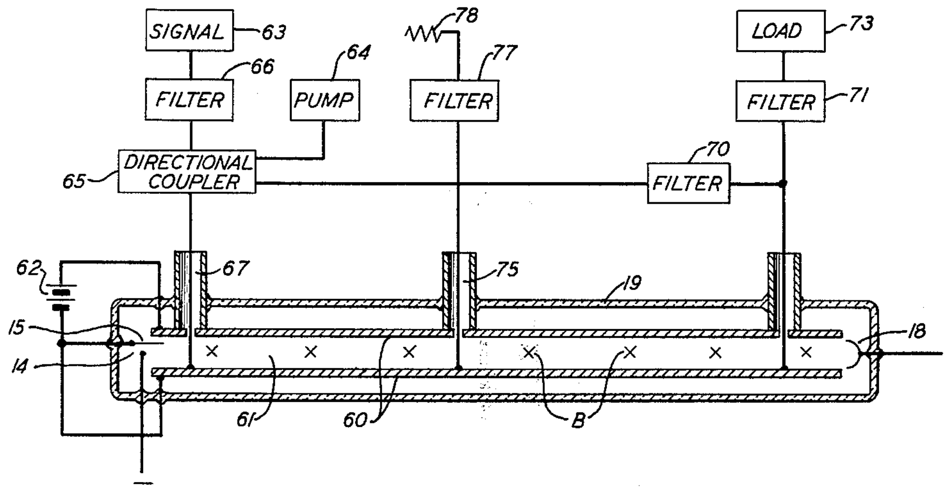
FIG. 4 is a cross-sectional view of another illustrative embodiment of my invention.

An even more simply constructed device than that of FIG. 1 can be devised by combining the input and amplification sections. FIG. 4 illustrates a transverse field device 58 in which this combination has been effected. Wire cathode 14, wire accelerating anode 15, collector electrode 18, and envelope 19 function in the same manner as described with reference to FIG. 1 and so have been labelled accordingly. Crosses B indicate that the magnetic focusing field is going "into the paper." A D.-C. electric field between plates 60 of wave guide 61 is maintained by a voltage source 62.

Signal energy from source 63 and pump energy from source 64 are transmitted to a directional coupler 65, a filter 66 having a stop band at the pump frequency being connected between source 63 and coupler 65. Coupler 65 directs signal and pump energy to wave guide 61 via coaxial cable 67.

The length of wave guide 61 is such that signal wave energy is completely transferred to the beam and at the collector end is completely retransferred back to the wave guide by the aforementioned Kompfner-Dip principle. Filters 70 and 71 are similar to corresponding filters 49,

50 of FIG. 1. Signal energy is therefore transmitted to an appropriate load 73 while pump energy is transmitted to directional coupler 65 where it is directed back to wave guide 61 via coaxial cable 67. The distance from the input end of wave guide 61 to coaxial cable 75 is of an appropriate Kompfner-Dip length such that at the position of cable 75 fast cyclotron noise energy within the frequency bands of the signal and idler waves are completely transferred from the beam to the wave guide. Noise energy is then transmitted via filter 77 to impedance 78 where it is dissipated. At the position of coaxial cable 75, signal energy is propagating as a fast cyclotron wave of the beam, although the pump wave is propagating along the wave guide. Filter 77 is therefore employed to prevent pump energy from being transmitted to impedance 78.

It is clear from the foregoing illustrations that the proper design of the various Kompfner-Dip lengths involved is a very important consideration. Examination of Equation 7 shows that as the signal frequency which is to be transferred to the beam decreases, the necessary Kompfner-Dip length L tends to increase. Further, the interaction impedance K decreases with decreasing signal frequency which also increases the Kompfner-Dip length requirement. There is, then, the danger that at low frequencies the tube may become undesirably long. This effect can be compensated, to a certain extent, by making the beam voltage $V_0$ low and the beam current $I_0$ high. This compensation can be accomplished to a large extent in the embodiments illustrated in FIGS. 1 and 4 because these devices are focused by crossed fields. It is possible, for example, to make voltage $V_0$ less than one volt without introducing any substantial deleterious effects. Further, the beams of the devices of FIGS. 1 and 4 are relatively wide, as shown in FIG. 1, and can be made even wider, thereby increasing $I_0$ and further shortening the tube length.

However, for further shortening of the Kompfner-Dip length, one may decrease the phase velocity $v_f$ of the propagating wave through the use of a slow wave structure. The term "slow wave structure" as used herein refers to any propagating structure which transmits an electromagnetic wave at a phase velocity lower than the velocity of light. This can be contrasted with the term "fast wave structure" which transmits an electromagnetic wave at a phase velocity which is equal to, or faster than, the velocity of light. Besides reducing the velocity $v_f$ of a wave propagating thereon, the use of a slow wave structure increases the interaction impedance K and therefore further reduces the Kompfner-Dip length. Another advantage of using a slow wave structure is the increased bandwidth of frequencies which can be applied to, and stripped from, the beam. It is well known that a shorter Kompfner-Dip length results in a wider operational frequency bandwidth.

Figure 5:
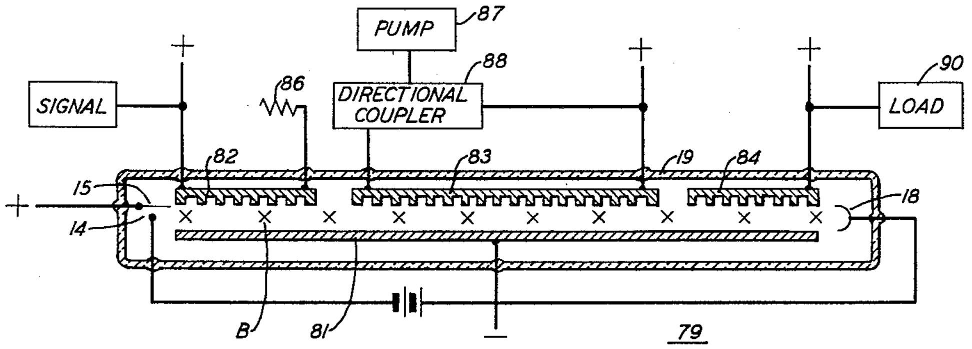
FIG. 5 is a cros-sectional view of still another illustrative embodiment of my invention.

Referring now to FIG. 5, there is shown an electron discharge device 79 which utilizes the principles of slow wave propagation. Cathode 14, anode 15, collector 18, and envelope 19 function in the same manner as described with reference to FIG. 1 and have been labelled accordingly. Crosses B indicate the magnetic field going "into the paper." A D.-C. electric field is produced by a sole plate 81 which is charged negatively with respect to slow wave structure 82, 83 and 84.

Slow wave structure 82 serves to transfer signal energy from source 85 to the fast cyclotron wave of the electron beam and extract fast cyclotron wave noise energy to be dissipated by impedance 86. Slow wave structure 83 transmits a pump wave from source 87 in coupling relationship to the beam to effect parametric amplification of the fast cyclotron signal wave. Directional coupler 88 prevents pump energy from returning to source 87. Slow wave structure 84 is of the proper Kompfner-Dip length to extract the signal energy from the beam to be utilized by a load 90.

The slow wave structures illustrated in FIG. 5 are known as Millman structures. A slow wave propagating thereon will create a circularly polarized field, i.e., longitudinal and transverse field components which are 90 degrees out of phase. Numerous other structures such as interdigital structures or serpentine structures which give rise to circularly polarized fields could alternatively be used.

The transverse field component $E_{yp}$ of the pump wave is in the same phase relationship with the fast cyclotron wave as described with reference to curve 54 of FIG. 3 and therefore provides amplification. The longitudinal field, that is, the field in the $z$ direction, $E_{zp}$, leads the transverse field by 90 degrees and produces a similar amplification of the fast cyclotron wave.

Figure 6:
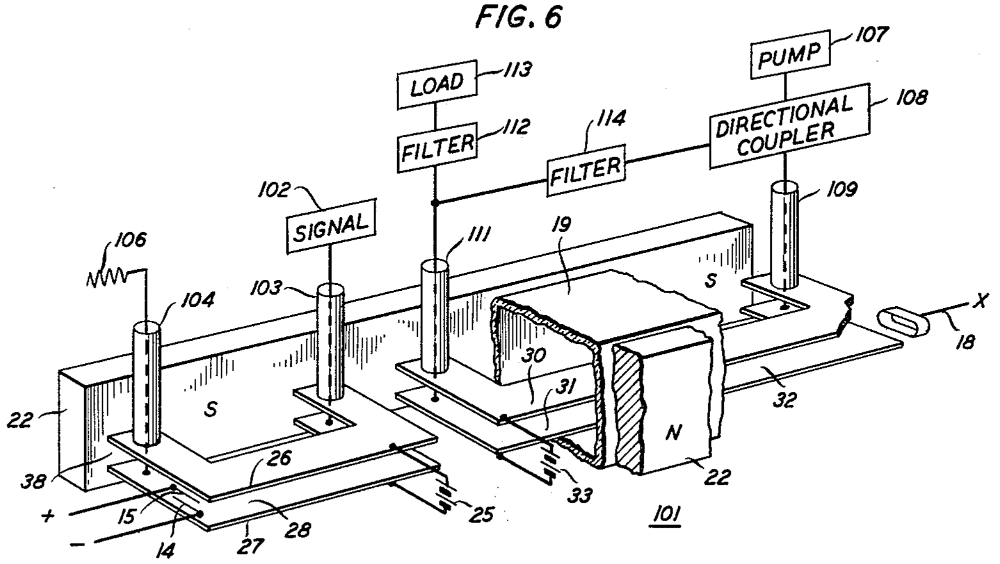
FIG. 6 is an isometric view of another illustrative embodiment of my invention.

In the foregoing embodiments, the signal was applied to the beam and the noise extracted therefrom by circuits utilizing the Kompfner-Dip principle. In FIG. 6 there is disclosed an embodiment of the present invention wherein the Kompfner-Dip principle is not utilized and hence the lengths of the various circuits are not critical. In FIG. 6 there is depicted an electron discharge device 101 which, for simplicity, has been shown as being identical, structurally, to the device 12 of FIG. 1. Because of the identity of structure, corresponding elements have been given the same reference numerals as used in FIG. 1 and they will not be discussed in detail here. The device 101 differs from the device 12 of FIG. 1 in that it is designed for operation in the backward wave mode, and, to this end, signal energy from a source 102 is fed through a coaxial line 103 to the downstream end of guide 28. The upstream or gun end of guide 28 is coupled to a coaxial cable 104 for extraction of noise from the circuit, the noise energy being fed to a dissipative member 106. Pump energy from a source 107 is applied to guide 32 through a directional coupler 108 and a coaxial cable 109. Amplified signal energy is extracted from the upstream end of guide 32 and fed through a coaxial cable 111 and filter 112 to a utilization device or load 113. The input to filter 112 is connected to directional coupler 108 through a filter 114, and, as was the case with the device 12 of FIG. 1, filter 112 has a stop-band at the pump frequency, thereby excluding pump energy from the load 113, while filter 114 has a stop-band at the signal frequency, thereby permitting feedback of pump energy to the pump input to the exclusion of signal energy.

In operation, the value of the magnetic field is so chosen that the cyclotron frequency $\omega_c$ is greater than the signal frequency $\omega_s$, in which case it can be seen from Equation 4 that the phase constant $\beta_{fast}$ is negative. Under these conditions, the electron beam interacts with a wave travelling in the opposite direction, and as a consequence, signal energy introduced into guide 28 at the downstream end interacts, as it travels toward the upstream end of guide 28, with the beam, as does pump energy introduced at the downstream end of guide 32.

Because the electrons in the beam are traveling in a direction opposite to that of the wave, the relationships discussed in connection with FIGS. 2 and 3 no longer obtain. It can be shown, however, by an analysis similar to that given with respect to FIGS. 2 and 3, that the amplitude of a signal introduced into guide 28 at the downstream end decreases in exponential fashion as it travels toward the upstream end, and, if guide 28 is sufficiently long, substantially all of the signal energy is transferred to the beam. In like manner, noise energy on the beam is transferred to the guide 28, its amplitude increasing exponentially toward the upstream end. Unlike the Kompfner-Dip, this contradirection dip is not periodic, hence, whereas with the Kompfner-Dip there can be a retransfer of energy if the circuit length is not correct, no such retransfer occurs with the contradirectional dip. It can be seen, therefore, that the length of guide 28 is not critical in the device 101. The same considerations apply equally to guide 32 where signal energy is extracted from the beam, its amplitude increasing exponentially. From Equation 6 it can be seen that the Kompfner-Dip length varies with variations in current and voltage, thus any slight variation in one of these parameters during operation impairs the efficiency of the device. On the other hand, with backward mode operation as just described, there is no criticality of length, and voltage and current variations have little effect.

It has been pointed out in the preceding discussion that the idler wave which is produced couples strongly to the signal wave. Thus noise in the idler can be transferred to the signal. As further stated, where the signal and idler frequencies are equal, i.e., each is one-half the pump frequency, there is no noise problem since the Kompfner-Dip circuit extracts noise from both. Also, with reference to Equation 9, it has been pointed out that if the idler frequency is much higher than the signal frequency, the load noise can be reduced. Under certain circumstances, however, it may be inconvenient to use a materially higher idler frequency, which means a materially higher pump frequency, especially when high signal frequencies are involved.

Figure 7:
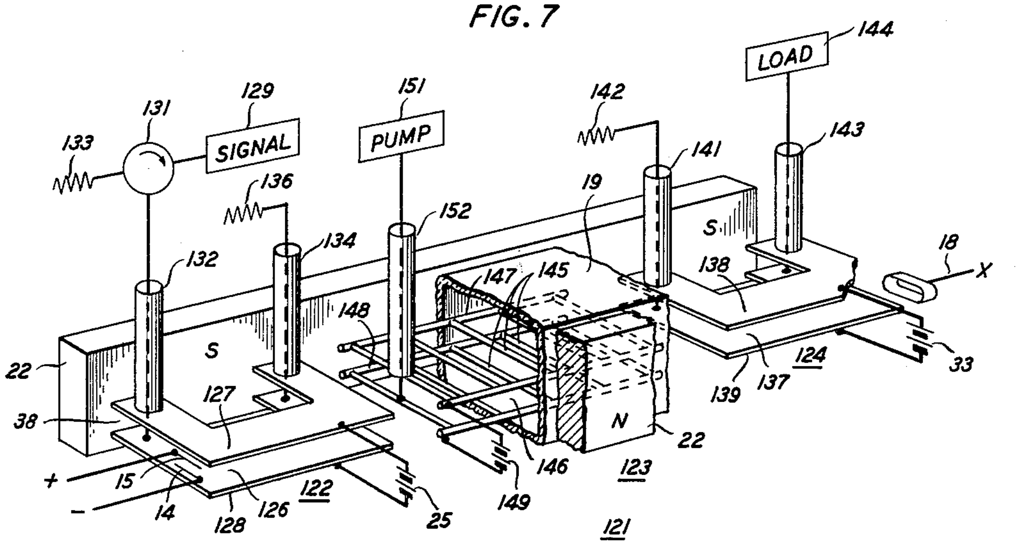
FIG. 7 is an isometric view of a further illustrative embodiment of my invention.

In FIG. 7 there is depicted an embodiment of the present invention which permits the use of a pump frequency which is not exactly twice the signal frequency, but which does not have to be extremely high in order to produce a high idler frequency.

There is shown in FIG. 7 an electron discharge device 121 having an input section 122, a pumping section 123, and an output section 124. Inasmuch as device 121 has a number of elements which correspond to similar elements in the device 12 of FIG. 1, these elements, for simplicity, have been given the same reference numerals as in FIG. 1 and will not be discussed in detail.

Input section 122 comprises a wave guide 126 which is shown here as a stripline having an upper strip 127 and a lower strip 128 biased as shown by a battery 25. A signal source 129 is coupled to the upstream end of guide 126 through a circulator 131 and a coaxial line 132. A third part of the circulator 131, which may take any one of a number of well-known forms, is connected to a dissipative member 133, the purpose of which will be explained more fully hereinafter. Connected to the downstream end of guide 126 is a coaxial line 134, the other end of which is connected to a dissipative member 136. As with the device of FIG. 1, the length of the guide 126 is the Kompfner-Dip length for the signal frequency.

Output section 124 comprises a wave guide 137, shown here as a stripline having an upper strip 138 and a lower strip 139 biased as shown by a battery 33. Connected to the upstream end of guide 137 is a coaxial cable 141, the other end of which is connected to a dissipative member 142, the purpose of which will be explained more fully hereinafter. The downstream end of guide 137 has connected thereto a coaxial cable 143, the other end of which is connected to a load or utilization device 144. Like line 126, the length of line 137 is the Kompfner-Dip length at the signal frequency.

Interposed between input section 122 and output section 124 is the pumping section 123. Section 123 comprises a ladder type delay line 146 having an upper member 147 and a lower member 148 each having a plurality of transverse "rungs" 145, biased as shown by a battery 149. While line 146 is shown as a ladder type line, which is well known to workers in the art, it may take any one of a number of other well-known forms having certain characteristics to be discussed more fully hereinafter. A source 151 of pump energy is connected to line 146 through a coaxial line 152, as shown. The frequency $\omega_p$ of the pump energy may be such that the idler frequency $\omega_i$ is not equal to the signal frequency $\omega_s$, but does not differ too much. Such a relationship obviates the necessity of maintaining the exact relationships required in the degenerate case where $\omega_i$ and $\omega_s$ are equal.

The magnetic field produced by magnets 22 is chosen such that the signal frequency $\omega_s$ is greater than $\omega_c$, thereby making the phase constant $\beta_{fast}$ of Equation 4 positive. With the cyclotron frequency $\omega_c$ determined, the pump frequency $\omega_p$ is such that the idler frequency $\omega_i$ is less than $\omega_c$, thereby, as seen from Equation 4, producing a negative phase constant. As a consequence of these relationships, the phase constant $\beta_p$ of the pump will be very small, as can be seen from Equation 12*a*, and if $\omega_s$ and $\omega_i$ differ only slightly, $\beta_p$ will be approximately zero. In order, therefore, that the pump energy may be maintained in interacting relationship with the beam, it is necessary that line 146 of pumping section 123 be able to support the pump wave at a substantially zero phase constant. To this end, transverse members 145 are given a length equal to one-half the pump wave length, in which case line 146 is substantially a resonant circuit, or a plurality of resonant circuits. As pointed out before, other types of circuits other than a ladder line may be used, provided they can support the pump wave at a substantially zero phase constant.

In operation, a signal is applied from source 129 through circulator 131 to the upstream end of line 126. As was the case with the device of FIG. 1, since line 126 is of Kompfner-Dip length, the signal energy is substantially completely transferred to the beam, while noise at the signal frequency is substantially completely extracted from the beam and dissipated in member 136. At the same time, however, noise at the idler frequency, which has a negative phase constant, and hence travels in the opposite direction to the beam, is extracted from the beam in accordance with the principles discussed in connection with the device of FIG. 6. This noise energy is abstracted from line 126 at its upstream end through line 132 and applied to circulator 131, which directs it into member 133 where it is dissipated. It can be seen, therefore, that coupling between signal and idler does not degrade the noise performance, since both are substantially noise free. The "clean" beam then passes through pump section 123 where parametric amplification takes place as explained heretofore, and then enters output section 124. The operation of output section 124, wherein line 137 is the Kompfner-Dip length, is similar to that of the input section. The forward traveling signal wave is substantially completely extracted from the beam and applied to load 144, while the backward traveling idler wave is extracted and applied to member 142, where it may be dissipated or utilized.

From the foregoing, it can be seen that the effects of idler noise are eliminated in the device of FIG. 7 without the necessity of an extremely high frequency idler or of a pump frequency exactly twice the signal frequency, and without the necessity of separate idler frequency noise stripping apparatus.

Although only a few embodiments of my invention have been illustrated, it is apparent that numerous other embodiments are possible. For example, any of numerous forms of fast wave structures such as the wave guides of FIGS. 1 and 4 could alternatively be used in place of the slow wave structures of FIG. 5. Further, a single slow wave structure could be used as by being substituted for the wave guide of FIG. 4. The use of wave guides or "fast wave structures," which are merely particular forms of distributed circuits, have been stressed because they offer the obvious advantages of mechanical simplicity and high frequency operation. However, it is also possible that lumped circuits could be used for coupling energy to the beam. This form of coupling has not been specifically illustrated because it involves the sacrifice of the advantages pointed out which are inherent with the use of distributed circuits. Numerous other arrangements may be devised by those skilled in the art without departing from the spirit and scope of this invention.

What is claimed is:

1. An electron discharge device comprising means for forming and projecting a beam of electrons along a path, means for focusing said beam comprising means for producing mutually perpendicular electric and magnetic fields along said path, said fields being transverse to the direction of flow of said electron beam, means for causing signal energy to propagate along said beam as a fast cyclotron wave, means for propagating an electromagnetic wave with its electric field transverse to said path and in coupling relationship to the cyclotron mode of said beam and in synchronism with said fast cyclotron signal wave, and means for extracting said signal energy from said beam, the frequencies of the signal energy and said electromagnetic wave being so related as to produce parametric emplification.

2. An electron discharge device comprising means for forming and projecting a beam of electrons along a path, means extending along substantially the entire length of said path for producing a magnetic field transverse to said path, means extending along substantially the entire length of said path for producting an electric field which is transverse to both said path and said magnetic field, distributed circuit means for causing electromagnetic signal energy to propagate along said beam as electron rotational energy and for extracting certain noise energy from said beam, distributed circuit means for transmitting electromagnetic pump wave energy with the electric field thereof transverse to said path and in coupling relationship to the cyclotron mode of said beam, the frequencies of the signal energy and said electromagnetic wave energy being so related as to produce parametric amplification, and distributed circuit means for the extracting said electron rotational energy from said beam.

3. The electron discharge device of claim 2 wherein said first mentioned distributed circuit means comprises a first pair of conductive plates, and said second and third mentioned distributed circuit means comprise a second pair of conductive plates.

4. The electron discharge device of claim 2 wherein said first, second and third mentioned distributed circuit means comprise a wave guide which propagates an electromagnetic wave at substantially the velocity of light.

5. The electron discharge device of claim 4 wherein said wave guide comprises a pair of parallel conductive plates.

6. The electron discharge device of claim 2 wherein each of said distributed circuit means comprises a slow wave structure.

7. The electron discharge device of claim 2 wherein said first, second and third mentioned distributed circuit means each comprises a slow wave structure.

8. The electron discharge device of claim 2 wherein each of said distributed circuit means includes means constructed so as to support a TEM mode of electromagnetic wave propagation therealong.

9. An electron discharge device comprising first and second distributed circuits each having an input end and an output end, means for projecting a beam in coupling relationship to said circuits, a first source of electromagnetic wave energy having a first frequency coupled to the input end of said first circuit, an impedance coupled to the output end of said first circuit, a source of electromagnetic pump wave energy having a second frequency coupled to the input end of said second distributed circuit, said first and second frequencies being so related as to produce parametric amplification, a load coupled by a first filter to the output end of said second distributed circuit, said first filter having a stopband at said second frequency, and a second filter coupled between said input and output ends of said second circuit having a stopband at said first frequency, means for producing a transverse magnetic field along said path and means for producing an electric field transverse to said magnetic field and said path along the length of said path.

10. A parametric amplifier comprising means for forming and projecting a beam of electron along a path, means for producing crossed electric and magnetic focusing fields along said path thereby producing in said beam an inherent cyclotron mode of energy propagation, said fields being transverse to the direction of said electron beam, a source of signal wave energy, means for transmitting said signal wave energy in a direction opposite the direction of electron beam flow with the electric field thereof transverse to said path and in coupling relationship with the cyclotron mode of said beam, a source of pump wave energy, and means for transmitting said pump wave energy in a direction opposite the direction of electron beam flow with the electric field thereof transverse to said path and in coupling relationship with the cyclotron mode of said beam, the frequencies of the signal wave energy and the pump wave energy being so related as to produce parametric amplification.

11. An electron discharge device comprising means for forming and projecting a beam of electrons along a path, means for producing mutually prependicular transverse electric and magnetic focusing fields along said path thereby producing in said beam an inherent cyclotron frequency, a source of signal wave energy to be amplified, means for transmitting the signal wave energy with the electric field thereof transverse to said path and in coupling relationship with the cyclotron mode of the beam, means at the downstream end of said transmitting means for introducing signals from said source onto said transmitting means for propagation therealong in a direction opposite to that of the electron beam, means connected to the upstream end of said transmitting means for dissipating noise energy at the signal frequency, a source of pump wave energy, means for maintaining said pump wave energy with the electric field thereof transverse to said path and in coupling relationship with the cyclotron mode of the beam, means at the downstream end of said maintaining means for introducing pump energy from said source onto said maintaining means for propagation therealong in a direction opposite to that of the electron beam, the frequencies of the signal and pump energy be such as to produce parametric amplification, and means at the upstream end of said maintaining means for extracting amplified signal energy from said maintaining means.

12. An electron discharge device as claimed in claim 11 wherein each of said transmitting means and said maintaining means have a length equal to the Kompfner-Dip length at the signal frequency.

13. An electron discharge device as claimed in claim 11 wherein the cyclotron frequency $\omega_c$ is greater than the frequency $\omega_s$ of the signal wave energy and the frequency $\omega_p$ of the pump wave energy is less than twice the cyclotron frequency $\omega_c$.

14. A parametric type amplifier comprising means for producing a stream of electrons and for projecting said stream along a predetermined path, magnet means for providing a magnetic field transverse to said electron stream along said path, electric means for providing an electric field transverse to said electron stream along said path and perpendicular to said magnetic field, input coupler means disposed in electromagnetic relationship with said electron stream for substantially removing the noise from the fast cyclotron wave of said electron stream and for modulating said fast cyclotron wave with a radio-frequency signal of frequency $\omega_s$ to be amplified, cyclotron pump means of a frequency differing from $\omega_s$ disposed in electromagnetic relationship with said electron stream downstream from said input coupler means for parametrically pumping electromagnetic energy to the cyclotron component of motion of the electrons in said electron stream, the frequency of the pump means and the signal frequency being so related that the average magnitude of the cyclotron motion is increased, and output coupling means disposed in electromagnetic energy exchange relationship with said stream and downstream from said cyclotron pumping means for coupling electromagnetic energy of frequency $\omega_s$ from said cyclotron component of electron motion in said stream.

15. A parametric type amplifier comprising: means for producing a stream of electrons and for projecting said stream along a predetermined path, magnet means for providing a magnetic field tranverse to said electron stream along said path, electric means for providing an electric field transverse to said electron stream along said path and perpendicular to said magnetic field, input coupler means disposed in electromagnetic relationship with said electron stream for substantially removing the noise from the fast cyclotron wave of said electron stream and for modulating said fast cyclotron wave with a radio-frequency signal of frequency $\omega_s$ to be amplified, cyclotron pump means of frequency $2\omega_s$ disposed in electromagnetic relationship with said electron stream downstream from said input coupler means for parametrically pumping electromagnetic energy to the cyclotron component of motion of the electrons in said electron stream so that their average magnitude of cyclotron motion is increased, and output coupling means disposed in electromagnetic energy exchange relationship with said stream and downstream from said cyclotron pump means for coupling electromagnetic energy of frequency $\omega_s$ from said cyclotron component of electron motion from said stream.

References Cited by the Examiner

UNITED STATES PATENTS

| | | | |
|---|---|---|---|
| 2,880,355 | 3/1959 | Epsztein | 315—3.5 |
| 2,890,372 | 6/1959 | Dench | 315—3.5 |

OTHER REFERENCES

Adler, R.: Proc. I.R.E., June 1958, pp. 1300–1301, vol. 46, No. 6.

ROY LAKE, *Primary Examiner.*

RALPH G. NILSON, ELI J. SAX, BENNETT G. MILLER, *Examiners.*